United States Patent
Paschkowski et al.

(10) Patent No.: US 8,932,721 B2
(45) Date of Patent: Jan. 13, 2015

(54) LAMINATES JOINED BY POLYURETHANE HOT-MELT ADHESIVE AND PROCESS FOR BONDING PLASTICIZER-CONTAINING PLASTICS

(75) Inventors: Kai Paschkowski, Jort (DE); Doreen Janke, Bonningstedt (DE); Urs Burckhardt, Zurich (CH); Mario Slongo, Tafers (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/316,232

(22) Filed: Dec. 9, 2011

(65) Prior Publication Data

US 2012/0107616 A1 May 3, 2012

Related U.S. Application Data

(63) Continuation of application No. 12/149,498, filed on May 2, 2008, now abandoned.

(30) Foreign Application Priority Data

May 11, 2007 (EP) .................................... 07108058

(51) Int. Cl.
  *B32B 27/40* (2006.01)
  *C09J 175/04* (2006.01)

(52) U.S. Cl.
  USPC ............... 428/423.1; 428/412; 428/424.6; 428/424.7; 156/331.7

(58) Field of Classification Search
  USPC .................. 428/412, 423.1, 424.6, 424.7; 156/331.4
  See application file for complete search history.

(56) References Cited

U.S. PATENT DOCUMENTS

| | | | |
|---|---|---|---|
| 4,853,454 A | 8/1989 | Merger et al. | |
| 5,068,402 A | 11/1991 | Pedain et al. | |
| 6,136,942 A | 10/2000 | Pfenninger et al. | |
| 7,153,576 B2 * | 12/2006 | Wang et al. | 428/412 |
| 2005/0033004 A1 | 2/2005 | Hoffmann et al. | |
| 2006/0122352 A1 | 6/2006 | Burckhardt | |
| 2006/0149025 A1 | 7/2006 | Burckhardt | |
| 2006/0188704 A1 | 8/2006 | Mikami et al. | |
| 2007/0129522 A1 | 6/2007 | Burckhardt et al. | |
| 2008/0251204 A1 | 10/2008 | Burckhardt et al. | |
| 2008/0280145 A1 * | 11/2008 | Paschkowski et al. | 428/412 |

FOREIGN PATENT DOCUMENTS

| | | |
|---|---|---|
| DE | 43 43 468 A1 | 6/1995 |
| EP | 0 254 177 A2 | 1/1988 |
| EP | 0 761 415 A2 | 3/1997 |

(Continued)

OTHER PUBLICATIONS

Japanese Office Action issued Nov. 24, 2010 in related Japanese Patent Application No. 2008-123881 with English translation.

(Continued)

*Primary Examiner* — Thao T. Tran
(74) *Attorney, Agent, or Firm* — Oliff PLC

(57) ABSTRACT

The present invention relates to laminates of a plasticizer-containing plastic, obtained by bonding by means of a moisture-reactive hot-melt adhesive which comprises at least one aldimine and at least one polyurethane polymer which contains isocyanate groups and is solid at room temperature. The bonded assembly is notable for improved adhesive, particularly following heat/moisture storage or alternating storage. Preferred embodiments of such laminates are bonded films or film-laminated supports, the film preferably being a pPVC film.

28 Claims, 2 Drawing Sheets

(56) References Cited

FOREIGN PATENT DOCUMENTS

| EP | 1 335 641 A1 | 8/2003 |
|----|--------------|--------|
| EP | 1 524 282 A1 | 4/2005 |
| EP | 1 770 107 A1 | 4/2007 |
| JP | A 2003-067694 | 3/2003 |
| JP | A 2005-504867 | 2/2005 |
| JP | A 2005-533865 | 11/2005 |
| JP | A 2005-533916 | 11/2005 |
| WO | WO 03/031490 A1 | 4/2003 |
| WO | WO 2004/013200 A1 | 2/2004 |
| WO | WO 2006/050242 A1 | 5/2006 |
| WO | WO 2007/036574 A1 | 4/2007 |
| WO | WO 2007/036575 A1 | 4/2007 |

OTHER PUBLICATIONS

Houben-Weyl, "Methoden der Organischen Chemie", vol. VIII, 1952, pp. 516-528.
Houben-Weyl, "Methoden der Organischen Chemie", vol. XI/2, 1958, pp. 73-88.

\* cited by examiner

LAMINATES JOINED BY POLYURETHANE HOT-MELT ADHESIVE AND PROCESS FOR BONDING PLASTICIZER-CONTAINING PLASTICS

CROSS-REFERENCE TO RELATED APPLICATIONS

This is a Continuation of application Ser. No. 12/149,498, filed May 2, 2008, now abandoned which claims the benefit of European Application No. 07108058.4, filed on May 11, 2007, the entire disclosures of which are hereby incorporated by reference herein in their entirety.

FIELD OF THE INVENTION

The invention relates to the field of hot-melt adhesives containing isocyanate groups and to the bonding of plasticizer-containing plastics, more particularly of films.

BACKGROUND ART

Hot-melt adhesives (hot melts) are adhesives which are based on thermoplastic polymers. These polymers are solid at room temperature but soften on heating to become viscous liquids and can therefore be applied in the form of a melt. In contrast to what are referred to as warm-melt adhesives (warm melts), which have a pastelike consistency and are applied at slightly elevated temperatures, typically in the range from 40 to 80° C., the hot-melt adhesives are applied at temperatures of 80° C. or above, typically 85° C. or above. On cooling to room temperature they solidify and at the same time develop the bond strength. Conventional hot-melt adhesives are non-reactive adhesives. On heating they soften or melt again, so making them unsuited to use at elevated temperature. Furthermore, conventional hot-melt adhesives often show a tendency, even at temperatures well below the softening point, to creep (cold flow).

These disadvantages have been largely eliminated in the case of what are called the reactive hot-melt adhesives through the introduction into the polymer structure of reactive groups which lead to crosslinking. Particularly suitable reactive hot-melt adhesives are polyurethane compositions, also referred to for short as PUR-RHM. These compositions are typically composed of polyurethane polymers which contain isocyanate groups and are obtained by reacting suitable polyols with an excess of diisocyanates. Following their application, they rapidly develop a high bond strength, by cooling, and acquire their ultimate properties, more particularly heat distortion resistance and resistance to environmental influences, through the crosslinking of the polyurethane polymer as a result of the reaction of the isocyanate groups with moisture. Owing to the carbon dioxide gas produced during the crosslinking reaction, however, there is a danger of bubbles forming within the adhesive, which may reduce the ultimate strength and the substrate adhesion and also, in the case of visible bonds, in the packaging sector for example, may adversely affect the aesthetics. Particularly prone to forming bubbles are amorphous PUR-RHM, since the skin of cured adhesive that forms from the surface is extremely impervious to carbon dioxide. At the same time the skin also allows virtually no moisture to penetrate the lower-lying, as yet uncured layers of adhesive, with the consequence that complete crosslinking takes an extraordinarily great time or does not come about at all with such adhesives.

In the field of the one-component polyurethanes which are applied at room temperature, systems which cure without bubbles are known. They typically comprise latent curing agents, more particularly aldimines. WO 2004/013200 A1 describes compositions which comprise polyaldimines, can be applied at room temperature and cure without a nuisance odour. WO 2007/036574 A1 discloses compositions which can be applied at room temperature and comprise aldimine-containing compounds which are obtainable from polyisocyanates and aldimines with groups containing active hydrogen. WO 2007/036575 A1 discloses compositions comprising polyurethane polymers that are solid at room temperature and contain aldimine groups, these compositions being suitable for use as reactive polyurethane hot-melt adhesives.

Plastics have for a long time already been bonded using hot-melt adhesives. More particularly they are adhered as a film to supports in laminations. Plastics used are often plasticizer-containing plastics, more particularly in the form of films. One plasticizer-containing plastic frequently used for technical purposes is plasticized polyvinyl chloride (pPVC). When plasticizer-containing plastics are bonded with hot-melt adhesives, however, more particularly with reactive polyurethane hot-melt adhesives, a problem very frequently evident is that the adhesion of the adhesive to the plastic is adversely affected by the plasticizer present in the plastic, and the strength of the adhesive bond begins to lessen soon after its production, and in time may lead to complete loss of adhesion. Owing to the fact that the plasticizer of the plasticizer-containing plastic in an adhesive bond with a plasticizer-free substrate may occasionally even be detected on the surface of the plasticizer-free substrate, it must be assumed that to a large extent the plasticizer migrates from the plasticizer-containing plastic into the adhesive and occasionally even completely through the adhesive. Such migration on the part of a plasticizer, however, is extremely undesirable, since on the one hand, as already mentioned, the adhesive may gradually lose its adhesion to the plastic and, on the other hand, the plasticizer content of the plastic may be greatly reduced, possibly leading to its embrittlement.

DISCLOSURE OF THE INVENTION

It is an object of the present invention, therefore, to eliminate or to reduce the disadvantages of the bonding of plasticizer-containing plastics with reactive polyurethane hot-melt adhesives, more particularly the gradual loss of adhesion.

Surprisingly it has now been found that this problem can be solved with a laminate described herein. A substantial contribution to this solution is made by the use of aldimines in the hot-melt adhesive.

It has emerged that, in a laminate of this kind, the adhesion of the aldimine-containing adhesive to the substrates is better and lessens to a significantly reduced extent over time than in the case in a corresponding laminate without aldimine in the adhesive. More particularly it has been possible to measure significantly higher values for the roller peel strength, especially after hot/humid or alternating storage. It has emerged, moreover, that the migration of the plasticizer from the plasticizer-containing plastic into the adhesive is significantly lower. Further, it has surprisingly emerged that the drop in the mechanical properties of the adhesive that is caused by hot/humid or alternating storage is much lower.

In another aspect, the invention relates to a coated polymeric film, and also to a process for the bonding of a plasticizer-containing plastic, and also to the resulting articles.

Preferred embodiments of the invention are subject matter of the dependent claims.

EMBODIMENTS OF THE INVENTION

In a first aspect the present invention relates to a laminate which has
- a) at least one substrate S1;
- b) at least one hot-melt adhesive K; and
- c) at least one substrate S2.

The hot-melt adhesive here comprises at least one polyurethane polymer P, which contains isocyanate groups and is solid at room temperature, and at least one aldimine A.

The substrate S1 (first substrate) is joined to the substrate S2 (second substrate) via the hot-melt adhesive K, the substrate S1 and/or the substrate S2 having been pretreated, where appropriate, with a primer. Furthermore, the substrate S1 and/or the substrate S2 are/is a plasticizer-containing plastic.

The substrate S1, the adhesive K and the substrate S2 here form a layered construction which is capable, after solidification, or after curing, of the adhesive of transmitting high forces between the two substrates.

The term "polymer" embraces in the present document on the one hand a group of chemically uniform macromolecules which nevertheless differ in respect of degree of polymerization, molar mass and chain length and have been prepared by a polymerization reaction (addition polymerization, polyaddition, polycondensation). On the other hand the term also embraces derivatives of such a group of macromolecules from polymerization reactions, in other words compounds which have been obtained by reactions, such as addition reactions or substitution reactions, for example, of functional groups on existing macromolecules and which may be chemically uniform or chemically non-uniform. The term furthermore also embraces what are called prepolymers, in other words reactive oligomeric preadducts whose functional groups have participated in the synthesis of macromolecules.

The term "polyurethane polymer" embraces all polymers which are prepared by the diisocyanate polyaddition process. This also includes those polymers which are virtually or entirely free from urethane groups. Examples of polyurethane polymers are polyether-polyurethanes, polyester-polyurethanes, polyether-polyureas, polyureas, polyester-polyureas, polyisocyanurates and polycarbodiimides.

"Room temperature" refers to a temperature of 25° C.

Substance names beginning with "poly", such as polyaldimine, polyisocyanate, polyol or polyamine, in the present document identify substances which formally contain per molecule two or more of the functional groups that occur in their name.

The term "primary amino group" in the present document identifies an $NH_2$ group which is attached to one organic radical, while the term "secondary amino group" identifies an NH group which is attached to two organic radicals, which may also together be part of a ring.

An "aliphatic amino group" is an amino group which is attached to an aliphatic, cycloaliphatic or arylaliphatic radical. It therefore differs from an "aromatic amino group", which is attached directly to an aromatic or heteroaromatic ring, such as in aniline or 2-aminopyridine, for example.

For the invention it is essential that at least one of the substrates S1 and S2 is a plasticizer-containing plastic.

Plastics considered as plasticizer-containing plastics are, more particularly, plasticized polyvinyl chloride (pPVC) and ethylene/propylene/diene terpolymers (EPDM) and polyurethanes. A particularly preferred plasticizer-containing plastic is pPVC.

Plasticizers appropriate for this invention include, more particularly, phthalates, such as dioctyl phthalate, diisononyl phthalate, diisodecyl phthalate, diisoundecyl phthalate and diisotridecyl phthalate, and mixed phthalates, more particularly those of benzyl types; adipic and sebacic esters such as dioctyl adipate and dioctyl sebacate; fatty acid esters; and phosphates, such as tricresyl phosphate, epoxidized soya oils or linseed oils, benzoic esters or sulphonic esters.

A very wide variety of materials are suitable in principle as substrate S1 and/or S2. The material in question is more particularly a plastic, more particularly a thermoplastic, preferably a plastic selected from the group consisting of polyolefins, such as polypropylene (PE), polypropylene (PP), polybutylene (PB); poly(meth)acrylates, such as poly(methyl methacrylate) (PMMA); polystyrene (PS), polyamides, such as polyamide (PA), such as polyamide 11, polyamide 12 or polyamide 66, for example; polycarbonate (PC), acrylonitrile-butadiene-styrene copolymers (ABS), unplasticized polyvinyl chloride (uPVC), plasticizer-containing plastics, more particularly plasticized polyvinyl chloride (pPVC), ethylene/propylene/diene terpolymers (EPDM) and polyurethanes; blends of these plastics, and their composites.

A "composite" in this document is a material in which at least one plastic has been combined with at least one further material. Suitability is possessed more particularly by composites which comprise fibres and plastics.

Preferred substrates S1 and S2, besides the plasticizer-containing plastics, are, more particularly, ABS and PC and also their blends and composites.

Where necessary the substrates S1 and/or S2 may have been pretreated. Such a pretreatment may be mechanical, chemical or physicochemical in nature. Examples of pretreatments are abraiding, sandblasting, brushing, treatment with cleaners or solvents, application of an adhesion promoter, an adhesion promoter solution or a primer, or treatment by plasma, corona or flaming. If the substrate is a polyolefin, a pretreatment by plasma, corona or flaming, more particularly by means of an air plasma at atmospheric ambient pressure, is advisable prior to bonding in order to achieve sufficient initial adhesion. Air plasma pretreatments at atmospheric ambient pressure are carried out more particularly using plasma sources of the kind described in detail in EP 0 761 415 A1 and EP 1 335 641 A1 and available commercially from the company Plasmatreat GmbH, Steinhagen, Germany, more particularly by means of what is called the OpenAir® Plasma technology.

In one particularly preferred embodiment one substrate (S1 or S2) is pPVC and the other substrate (S2 or S1) is polycarbonate (PC) or an acrylonitrile-butadiene-styrene copolymer (ABS) or a PC/ABS blend or a PC/ABS composite.

In another particularly preferred embodiment both substrates, S1 and S2, are plasticized polyvinyl chloride (pPVC).

It is preferred if at least one of the two substrates S1 and/or S2 is in the form of a film. By films are meant, more particularly, flexible, substantially two-dimensional plastics in a thickness of 0.05 millimetre to 5 millimetres, which can be rolled up. Consequently the term embraces, as well as films, in the strict sense of thicknesses below 1 mm, also sealing sheets, of the kind typically used to seal tunnels, roofs or swimming pools and having a thickness of typically 1 to 3 mm, in special cases even up to 5 mm. Polymeric films of this kind are typically produced by spreading, casting, calendering or extrusion and are commonly available commercially in rolls or are produced on site. They may be of single-layer or multi-layer construction.

The hot-melt adhesive K comprises at least one aldimine A and at least one polyurethane polymer P which contains isocyanate groups and is solid at room temperature. The hot-melt adhesive is, accordingly, a moisture-reactive polyurethane hot-melt adhesive (PUR-RHM).

The polyurethane polymer P containing isocyanate groups and solid at room temperature is obtainable through the reaction of at least one polyol with at least one polyisocyanate.

Of more particular suitability as polyols are polyether polyols, polyester polyols and polycarbonate polyols, and also mixtures of these polyols.

More particularly suitable as polyether polyols, also called polyoxyalkylene polyols, are those which are addition-polymerization products of ethylene oxide, 1,2-propylene oxide, 1,2- or 2,3-butylene oxide, tetrahydrofuran or mixtures thereof, optionally polymerized by means of a starter molecule having two or more active hydrogen atoms, such as water, for example, ammonia or compounds having two or more OH or NH groups, such as 1,2-ethanediol, 1,2- and 1,3-propanediol, neopentyl glycol, diethylene glycol, triethylene glycol, the isomeric dipropylene glycols and tri-propylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made not only of polyoxyalkylene polyols which have a low degree of unsaturation (measured by ASTM D-2849-69 and reported in milliequivalents of unsaturation per gram of polyol (meq/g)), prepared for example by means of what are known as double metal cyanide complex catalysts (DMC catalysts), but also polyoxyalkylene polyols having a higher degree of unsaturation, prepared for example by means of anionic catalysts such as NaOH, KOH or alkali metal alkoxides.

Particularly suitable polyether polyols are polyoxyalkylene diols and triols, more particularly polyoxyalkylene diols. Particularly suitable polyoxyalkylene diols and triols are polyoxyethylene diols and triols and also polyoxypropylene diols and triols.

Particularly suitable polyoxypropylene diols and triols are those having a degree of unsaturation of less than 0.02 meq/g and a molecular weight in the range from 1000 to 30 000 g/mol, and also polyoxypropylene diols and triols having a molecular weight of 400 to 8000 g/mol. By 'molecular weight' or 'molar weight' is meant in the present document always the molecular weight average $M_n$. More particularly suitable are polyoxypropylene diols having a degree of unsaturation of less than 0.02 meq/g and a molecular weight in the range from 1000 to 12 000, more particularly between 1000 and 8000 g/mol. Polyether polyols of this kind are sold, for example, under the trade name Acclaim® by Bayer.

Likewise particularly suitable are what are called "EO endcapped" (ethylene oxide endcapped) polyoxypropylene diols and triols. The latter are special polyoxypropylene-polyoxyethylene polyols which are obtained, for example, by subjecting pure polyoxypropylene polyols, after the end of the polypropoxylation, to alkoxylation with ethylene oxide and which, as a result, contain primary hydroxyl groups.

Suitable polyester polyols are polyesters which carry at least two hydroxyl groups and are prepared by known methods, more particularly the polycondensation of hydroxycarboxylic acids or the polycondensation of aliphatic and/or aromatic polycarboxylic acids with dihydric or higher polyhydric alcohols.

Of more particular suitability are polyester polyols which are prepared from dihydric or trihydric, more particular dihydric, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (diinerdiol), neopentyl glycol hydroxypivalate, glycerol, 1,1,1-trimethylolpropane or mixtures of the aforementioned alcohols, with organic dicarboxylic or tricarboxylic acids, more particular dicarboxylic acids, or their anhydrides or esters, such as, for example, succinic acid, glutaric acid, adipic acid, trimethyladipic acid, sorbic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride, or mixtures of the aforementioned acids, and also polyester polyols formed from lactones such as, for example, from ∈-capro-lactone and starters such as the aforementioned dihydric or trihydric alcohols.

Particularly suitable polyester polyols are polyester diols. Polyester diols suitable more particularly are those prepared from adipic acid, azelaic acid, sebacic acid, dodecanedicarboxylic acid, dimer fatty acid, phthalic acid, isophthalic acid and terephthalic acid as dicarboxylic acid and from ethylene glycol, diethylene glycol, neopentyl glycol, 1,4-butanediol, 1,6-hexanediol, dimer fatty acid diol and 1,4-cyclohexanedimethanol as dihydric alcohol. Also of more particular suitability are polyester diols prepared from ∈-caprolactone and one of the aforementioned dihydric alcohols as starters.

The polyester polyols advantageously have a molecular weight of 1000 to 15 000 g/mol, more particularly of 1500 to 8000 g/mol, more particularly of 1700 to 5500 g/mol.

Suitable more particularly are polyester diols and triols, more particularly polyester diols, which at room temperature are liquid, amorphous, partially crystalline, and crystalline. Suitable polyester polyols liquid at room temperature are solid not far below room temperature, at temperatures between 0° C. and 25° C. for example, and are used preferably in combination of at least one amorphous, partially crystalline or crystalline polyester polyol. Particular suitability is possessed by amorphous polyester diols and also mixtures of amorphous polyester diols with polyester diols which are liquid at room temperature.

Suitable polycarbonate polyols are those of the kind obtainable by polycondensation of, for example, the above-mentioned dihydric or trihydric alcohols—those used to synthesize the polyester polyols—with dialkyl carbonates, such as dimethyl carbonate, diaryl carbonates, such as diphenyl carbonate, or phosgene.

Particular suitability is possessed by polycarbonate diols, more particularly amorphous polycarbonate diols.

Likewise suitable as polyols are block copolymers which carry at least two hydroxyl groups and which have at least two different blocks with a polyether, polyester and/or polycarbonate structure of the type described above.

Preferred polyols are polyester polyols and polycarbonate polyols, more particularly polyester diols and polycarbonate diols.

Particularly preferred are amorphous polyester diols and amorphous polycarbonate diols, and also mixtures of amorphous polyester or polycarbonate diols with polyester or polycarbonate diols that are liquid at room temperature.

Most preference is given to polyester diols, more particularly amorphous polyester diols, and also to mixtures of amorphous polyester diols with polyester diols that are liquid at room temperature.

Polyisocyanates that may be used for preparing a polyurethane polymer P include commercially customary aliphatic, cycloaliphatic or aromatic polyisocyanates, more particularly diisocyanates, examples being the following:

1,6-hexamethylene diisocyanate (HDI), 2-methylpentamethylene-1,5 diisocyanate, 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and -1,4-diisocyanate and any desired mixtures of these isomers, 1-methyl-2,4- and -2,6-diisocyanatocyclohexane and any desired mixtures of these isomers (HTDI or H$_6$TDI), 1-isocyanato-3,3,5-trimethyl-5-isocyanatomethyl-cyclohexane (i.e. isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), oligomers and polymers of the aforementioned isocyanates, and also any desired mixtures of the aforementioned isocyanates. Preference is given to MDI, TDI, HDI and IPDI. Particular preference is given to MDI and IPDI.

The polyurethane polymer P is prepared in a conventional way directly from the polyisocyanates and the polyols, or by stepwise adduction processes, of the kind also known as chain extension reactions.

In one preferred embodiment the polyurethane polymer P is prepared via a reaction of at least one polyisocyanate and at least one polyol, the isocyanate group being present in a stoichiometric excess over the hydroxyl groups. With advantage the ratio between isocyanate groups and hydroxyl groups is 1.3 to 2.5, more particularly 1.5 to 2.2.

The polyurethane polymer P is solid at room temperature. It may be crystalline, partially crystalline or amorphous. For a partially crystalline or amorphous polyurethane polymer P it is the case that it is of zero or low fluidity at room temperature, more particularly that it has a viscosity of more than 5000 Pa·s at 20° C.

The polyurethane polymer P has a molecular weight of preferably more than 1000 g/mol, more particularly a molecular weight between 1200 and 50 000 g/mol, preferably a molecular weight between 2000 and 30 000 g/mol.

Furthermore it advantageously has an average functionality in the range from 1.8 to 2.2.

The polyurethane polymer P is preferably transparent. A transparent polyurethane polymer solid at room temperature is typically prepared using either amorphous polyols or a mixture of amorphous polyols and polyols liquid at room temperature.

The polyurethane polymer P is preferably amorphous. Furthermore, the polyurethane polymer P is preferably transparent, both before and after crosslinking with moisture.

The polyurethane polymer P is present typically in an amount of 40%-98%, and more particularly of 60%-98%, preferably of 80%-98%, by weight, based on the hot-melt adhesive K.

The hot-melt adhesive K further comprises at least one aldimine A. As aldimine A it is possible in principle to use all known aldimines, more particularly polyaldimines and also monoaldimines which as well as the aldimino group also contain at least one isocyanate group.

Aldimines A can be prepared from primary amines and aldehydes. Suitable aldehydes include, for example, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde and diphenylacetaldehyde.

More particularly, however, preference is given to the aldimines A of the formula (I-A) and (I-B). Particularly preferred aldimines A of this kind are described in WO 2004/013088 A1, WO2007/036575 A1, WO2007/036571 A1, WO2007/036574 A1 and WO 2007/036572 A1, which are hereby incorporated by reference into the disclosure content of the present invention.

(I-A)

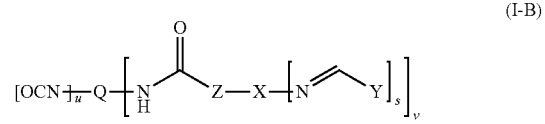

(I-B)

A feature of these preferred aldimines A is that their aldimino groups cannot undergo tautomerization to form enamino groups, since they have no hydrogen atom in the position α to the C atom of the aldimino group. This leads to particularly storage-stable hot-melt adhesives.

In one embodiment the aldimine A is an aldimine of the formula (I-A); this is a polyaldimine.

(I-A)

In this formula $X^P$ is a polyamine having w primary amino groups following removal of w primary amino groups, w is an integer 2-8, more particularly 2-4, preferably 2 or 3, and Y is a radical of the formula (I a) or (I b)

(Ia)

(Ib)

where
$Y^1$ and $Y^2$ either
 independently of one another are each a monovalent hydrocarbon radical having 1 to 12 C atoms,
 or together are a divalent hydrocarbon radical having 4 to 20 C atoms which is part of an unsubstituted or substituted carbocyclic ring having 5 to 8, preferably 6, C atoms;
$Y^3$ is a monovalent hydrocarbon radical which where appropriate has at least one heteroatom, more particularly oxygen in the form of ether, carbonyl or ester groups; and Y⁴ either
is a substituted or unsubstituted aryl or heteroaryl group which has a ring size of 5 to 8, preferably 6, atoms,
or is

where $R^1$ is a hydrogen atom or an alkoxy group,
or is a substituted or unsubstituted alkenyl or arylalkenyl group having 1-30 C atoms.

Polyamines which derive from the radical $X^P$ have the formula (IV-A).

(IV-A)

Suitable polyamines of the formula (IV-A) are, more particularly, polyamines having aliphatic primary amino groups, examples being the following:
- aliphatic diamines such as ethylenediamine, 1,3-propanediamine, 2-methyl-1,2-propanediamine, 2,2-dimethyl-1,3-propanediamine, 1,4-butanediamine, 1,5-pentanediamine, 1,6-hexamethylenediamine, 1,7-heptanediamine, 1,8-octanediamine, 1,9-nonanediamine, 1,10-decanediamine, 1,11-undecanediamine, 1,12-dodecanediamine, methylbis(3-aminopropyl)amine, 1,5-diamino-2-methylpentane (MPMD), 2,5-dimethyl-1,6-hexamethylenediamine, 1,2-propanediamine, 2-methyl-1,2-propanediamine, 1,3-butanediamine, 1,3-diaminopentane (DAMP), 2,2,4-trimethylhexamethylenediamine (TMD), 1,5-diamino-2-butyl-2-ethylpentane;
- cycloaliphatic diamines such as 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 2-methyl-1,3-diaminocyclohexane, 1,3- and 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0²,⁶]decane, 3,9-bis(3-aminopropyl)-2,4,8,10-tetraoxaspiro[5.5]undecane, 1,3- and 1,4-xylylenediamine, 1-amino-3-aminomethyl-3,5,5-trimethylcyclohexane (i.e. isophoronediamine or IPDA) and 1,4-diamino-2,2,6-trimethylcyclohexane (TMCDA);
- aliphatic diamines containing ether groups, such as bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine and higher oligomers of these diamines;
- polyoxyalkylene diamines, which typically represent products of the amination of polyoxyalkylene diols and are obtainable, for example, under the trade name Jeffamine® (from Huntsman Chemicals), under the name Polyetheramine (from BASF) or under the name PC Amine® (from Nitroil), such as, for example, Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559; Polyetheramine D 230, Polyetheramine D 400 and Polyetheramine D 2000, PC Amine® DA 250, PC Amine® DA 400, PC Amine® DA 650 and PC Amine® DA 2000;
- aliphatic triamines such as 4-aminomethyl-1,8-octanediamine, 1,3,5-tris(aminomethyl)benzene, 1,3,5-tris(aminomethyl)cyclohexane;
- polyoxyalkylene triamines, which typically represent products of the amination of polyoxyalkylene triols and are obtainable, for example, under the trade name Jeffamine® (from Huntsman Chemicals), under the name Polyetheramine (from BASF) or under the name PC Amine® (from Nitroil), such as, for example, Jeffamine® T-403, Jeffamine® T-5000; Polyetheramine T403, Polyetheramine T5000; and PC Amine® TA 403, PC Amine® TA 5000;
- primary polyamines of higher functionality, such as polyvinylamines or copolymers which carry primary amino groups, such as copolymers of allylamine and (meth)acrylates, for example;
- and also mixtures of the aforementioned polyamines.

Preferred polyamines of the formula (IV-A) are 1,6-hexamethylenediamine, 1,5-diamino-2-methylpentane (MPMD), 1,3-diaminopentane (DAMP), 1-amino-3-aminomethyl-3,5,5-trimethylcyclohexane (i.e. isophoronediamine or IPDA), 2,2,4- and 2,4,4-trimethylhexamethylenediamine, 4-aminomethyl-1,8-octanediamine, 1,3- and 1,4-xylylenediamine, 1,3- and 1,4-bis(aminomethyl)cyclohexane, bis-(4-aminocyclohexyl)methane, bis-(4-amino-3-methylcyclohexyl)methane, 3(4),8(9)-bis(aminomethyl)tricyclo[5.2.1.0²,⁶]decane, 1,2-, 1,3- and 1,4-diaminocyclohexane, 3,6-dioxaoctane-1,8-diamine, 4,7-dioxadecane-1,10-diamine, polyoxyalkylene-diamines and -triamines, and also mixtures of two or more of the aforementioned polyamines.

Preferred polyoxyalkylene diamines and triamines are more particularly the Huntsman products D-230, D-400, D-2000, T-403 and T-5000 available under the Jeffamine® trade name, and analogous compounds from BASF or Nitroil.

In a further embodiment the aldimine A is an aldimine of the formula (I-B)

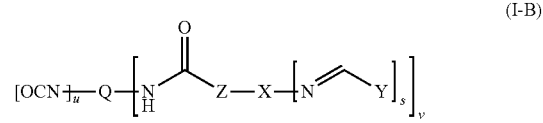
(I-B)

where
Q is the radical of a polyisocyanate containing (u+v) terminal isocyanate groups following removal of all the isocyanate groups;
u is 0 or 1 or 2;
v is 1 or 2 or 3;
s is 1 or 2, preferably 1;
Y is the radical of the formula (I a) or (I b)

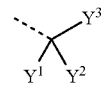
(Ia)

(Ib)

where
Y¹ and Y² either independently of one another are each a monovalent hydrocarbon radical having 1 to 12 C atoms, or together are a divalent hydrocarbon radical having 4 to 20 C atoms which is part of an unsubstituted or substituted carbocyclic ring having 5 to 8, preferably 6, C atoms;

$Y^3$ is a monovalent hydrocarbon radical which where appropriate has at least one heteroatom, more particularly oxygen in the form of ether, carbonyl or ester groups; and $Y^4$ either is a substituted or unsubstituted aryl or heteroaryl group which has a ring size of 5 to 8, preferably 6, atoms, or is

where $R^1$ is a hydrogen atom or an alkoxy group, or is a substituted or unsubstituted alkenyl or arylalkenyl group having 1-30 C atoms;

and

X either is an (s+1)-valent hydrocarbon radical having preferably 2 to 20 C atoms and containing heteroatoms where appropriate, or, if Z is N—$R^7$, is together with $R^7$ an (s+2)-valent hydrocarbon radical having preferably 3 to 20 C atoms and containing, where appropriate, at least one heteroatom, more particularly in the form of ether oxygen or tertiary amine nitrogen;

Z is O, S, NH, $NR^2$ or $NR^7$, where $R^2$ either is a monovalent hydrocarbon radical having 1 to 20 C atoms which where appropriate has at least one carboxylic ester, nitrile, nitro, phosphonic ester, sulphone or sulphonic ester group, or is a substituent of the formula (X)

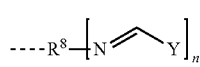 (X)

where n is 1 or 2, $R^8$ is an (n+1)-valent hydrocarbon radical which where appropriate contains heteroatoms, more particularly in the form of ether oxygen or tertiary amine nitrogen, and contains, where appropriate, active hydrogen in the form of hydroxyl groups, secondary amino groups or mercapto groups; and $R^7$ together with X is an (s+2)-valent hydrocarbon radical having preferably 3 to 20 C atoms which contains, where appropriate, at least one heteroatom, more particularly in the form of ether oxygen or tertiary amine nitrogen.

This is subject to the proviso that u+(v*s) has a value of ≥2.

Where Z is O, S, $NR^2$ or $NR^7$, the amines deriving from the radical X have the formula (IV-B) or (IV-B').

 (IV-B)

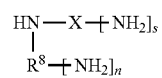 (IV-B')

Suitable amines of the formula (IV-B) or (IV-B') are, for example, the following:

aliphatic hydroxyamines such as 2-aminoethanol, 2-methylaminoethanol, 1-amino-2-propanol,3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol,10-amino-1-decanol, 12-amino-1-dodecanol, 4-(2-aminoethyl)-2-hydroxyethylbenzene,3-aminomethyl-3,5,5-trimethylcyclohexanol; derivatives, carrying one primary amino group, of glycols such as diethylene glycol, dipropylene glycol, dibutylene glycol and higher oligomers and polymers of these glycols, examples being 2-(2-aminoeth-oxy)ethanol, triethylene glycol monoamine and α(2-hydroxymethylethyl)-ω-(2-amino-methylethoxy)poly(oxy(methyl-1,2-ethanediyl)); derivatives, carrying one hydroxyl group and one or more primary amino groups, of polyalkoxylated trihydric or higher polyhydric alcohols or of polyalkoxylated diamines; products from the single cyanoethylation and subsequent hydrogenation of glycols, examples being 3-(2-hydroxyethoxy)propylamine, 3-(2-(2-hydroxy-ethoxy)ethoxy)propylamine and 3-(6-hydroxyhexyloxy)propylamine;

aliphatic mercaptoamines such as 2-aminoethanethiol (cysteamine), 3-aminopropanethiol, 4-amino-1-butanethiol, 6-amino-1-hexanethiol, 8-amino-1-octanethiol, 10-amino-1-decanethiol, 12-amino-1-dodecanethiol; amino thiosugars such as 2-amino-2-deoxy-6-thioglucose;

difunctional or polyfunctional aliphatic amines which in addition to one or more primary amino groups carry a secondary amino group, such as N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-aminoethylpiperazine, diethylenetriamine (DETA), bis-hexamethylenetriamine (BHMT); diamines and triamines from the cyanoethylation or cyanobutylation of primary monoamines and diamines, examples being N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butyl amino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, dipropylenetriamine (DPTA), N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine and fatty diamines such as N-cocoalkyl-1,3-propanediamine, N-oleyl-1,3-propanediamine, N-soyaalkyl-1,3-propanediamine, N-tallowalkyl-1,3-propanediamine or N—($C_{16-22}$-alkyl)-1,3-propanediamine, of the kind obtainable, for example, under the trade name Duomeen® from Akzo Nobel; the products from the Michael-like addition of aliphatic primary diamines or polyamines with acrylnitrile, maleic or fumaric diesters, citraconic diesters, acrylic and methacrylic esters and itaconic diesters, reacted with a 1:1 molar ratio.

Hydroxy amines and mercaptoamines that are suitable more particularly are those in which the primary amino group is separated from the hydroxyl group, or the mercapto group, respectively, by a chain of at least 5 atoms or by a ring, such as, for example, in 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-tri-methyl-cyclohexanol, 2-(2-aminoethoxy)ethanol, triethylene glycol monoamine, α-(2-hydroxymethylethyl)-ω-(2-aminomethylethoxy)poly(oxy(methyl-1,2-ethanediyl)), 3-(2-hydroxyethoxy) propylamine, 3-(2-(2-hydroxyethoxy)ethoxy)propylamine, 3-(6-hydroxyhexyloxy) propylamine, 6-amino-1-hexanethiol, 8-amino-1-octanethiol, 10-amino-1-decanethiol and 12-amino-1-dodecanethiol.

Preferred amines of the formula (IV-B) or (IV-B') are selected from the group consisting of N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, diethylenetriamine (DETA), bishexamethylenetriamine (BHMT), dipropylenetriamine (DPTA), fatty diamines, such as N-coco alkyl-1,3-propanediamine, N-oleyl-1,3-propanediamine, N-soyaalkyl-1,3-propanediamine and N-tallowalkyl-1,3-propanediamine; 5-amino-1-pentanol, 6-amino-1-hexanol, 4-(2-aminoethyl)-2-hydroxyethylbenzene, 3-aminomethyl-3,5,5-trimethyl-cyclohexanol, 2-(2-aminoethoxy)ethanol, triethylene glycol monoamine, 3-(2-hydroxyethoxy)propylamine, 3-(2-(2-hydroxyethoxy)ethoxy)propylamine and 3-(6-hydroxyhexyloxy)propylamine.

Where Z is NH, the amines deriving from the radical X have the formula (IV-B1).

$$H_2N—X—NH_2 \quad (IV\text{-}B1)$$

Suitable Amines of the Formula (IV-B1) are the Diamines Exemplified as polyamines of the formula (IV-A).

Amines of the formula (IV-B1) that are suitable more particularly are asymmetric aliphatic or cycloaliphatic primary diamines, more particularly 1,2-propanediamine, 2-methyl-1,2-propanediamine, 1,3-butanediamine, 1,3-diaminopentane (DAMP), 2,2,4-trimethylhexamethylenediamine (TMD), 1,5-diamino-2-butyl-2-ethyl-pentane, 1-amino-3-aminomethyl-3,5,5-trimethyl cyclohexane (i.e. isophoronediamine or IPDA) and 1,4-diamino-2,2,6-trimethylcyclohexane (TMCDA).

Preferred amines of the formula (IV-B1) are 1,3-diaminopentane (DAMP), 1,5-diamino-2-butyl-2-ethylpentane, 2,2,4-trimethylhexamethylenediamine (TMD) and 1-amino-3-aminomethyl-3,5,5-trimethylcyclohexane (i.e. isophoronediamine or IPDA).

Polyisocyanates which derive from the radical Q have the formula (V).

(V)

In one preferred embodiment the polyisocyanate of the formula (V) is a polyurethane polymer PUP containing isocyanate groups. A suitable polyurethane polymer PUP containing isocyanate groups is obtainable through the reaction of at least one polyol with at least one polyisocyanate. Suitable for this purpose are the polyols and polyisocyanates already described before for the polyurethane polymer P. The polyurethane polymer PUP may be solid or liquid. A particularly suitable polyurethane polymer PUP is a polyurethane polymer PUP1 which is solid at room temperature. More particularly the polyurethane polymer PUP1 is the same as the polyurethane polymer P which is solid at room temperature.

In another preferred embodiment the polyisocyanate of the formula (V) is a polyisocyanate PI in the form of a diisocyanate or of a low molecular mass oligomer of a diisocyanate or of a derivative of a diisocyanate, suitable diisocyanates being the same as those already identified as being suitable for the preparation of a polyurethane polymer P.

Suitability as polyisocyanate PI is possessed in particular by oligomers or oligomer mixtures of diisocyanates, more particularly of HDI, IPDI, TDI and MDI. Commercially available products are, more particularly, HDI biurets, in the form for example of Desmodur® N 100 and N 3200 (Bayer), Tolonate® HDB and HDB-LV (Rhodia) and Duranate® 24A-100 (Asahi Kasei); HDI isocyanurates, in the form for example of Desmodur® N 3300, N 3600 and N 3790 BA (all from Bayer), Tolonate® HDT, HDT-LV and HDT-LV2 (Rhodia), Duranate® TPA-100 and THA-100 (Asahi Kasei) and Coronate® HX (Nippon Polyurethane); HDI uretdiones, in the form for example of Desmodur® N 3400 (Bayer); HDI iminooxadiazinediones, in the form for example of Desmodur® XP 2410 (Bayer); HDI allophanates, in the form for example of Desmodur® VP LS 2102 (Bayer); IPDI isocyanurates, in solution in the form, for example, of Desmodur® Z 4470 (Bayer) or in solid form as Vestanat® T1890/100 (Degussa); TDI oligomers, in the form for example of Desmodur® IL (Bayer); and mixed isocyanurates based on TDI/HDI, in the form for example of Desmodur® HL (Bayer).

Preferred polyisocyanates PI are the oligomers of HDI and/or IPDI, more particularly the isocyanurates.

The aforementioned polyisocyanates PI typically represent mixtures of substances with different degrees of oligomerization and/or chemical structures. Preferably they have an average NCO functionality of 2.1 to 4.0 and contain, more particularly, isocyanurate, iminooxadiazinedione, uretdione, urethane, biuret, allophanate, carbodiimide, uretonimine or oxadiazinetrione groups.

The aldimines A are obtainable through a condensation reaction between an aldehyde and a primary amine with elimination of water. Condensation reactions of this kind are very well known and are described, for example, in Houben-Weyl, "Methoden der organischen Chemie", Vol. XI/2, page 73 et seq.

The aldimines A of the formula (I-A) can be prepared directly from polyamines of the formula (IV-A) and aldehydes of the formula (VI).

(VI)

The aldehyde of the formula (VI) is in this case used stoichiometrically or in a stoichiometric excess in relation to the primary amino groups of the amine. Condensation reactions of this kind are typically conducted in the presence of a solvent, by means of which the water formed during the reaction is removed azeotropically. For the preparation of the aldimines, however, preference is given to a preparation process without use of solvents, where the water formed in the condensation is removed from the reaction mixture by application of reduced pressure. The solvent-free preparation does away with the need for distillative removal of the solvent, thereby simplifying the preparation process. In this way, moreover, the aldimine is free from solvent residues.

The aldimines A of the formula (I-B) can be prepared in a two-step process. In a first stage an amine having s primary amino groups and a ZH group of the formula (IV-B) or of the formula (IV-B') is reacted with an aldehyde of the formula (VI) to give the aldimine of the formula (IX), in the same way as described before for the aldimine of the formula (I-A).

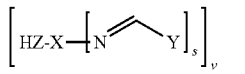

(IX)

In a second stage the aldimine of the formula (IX) is reacted with the polyisocyanate of the formula (V) to give the desired aldimine of the formula (I-B). Depending on the stochiometry employed, isocyanate groups remain in the aldimine of the formula (I-B), i.e. u>0, or all of the isocyanate groups are reacted, i.e. u=0.

The aldimines A of the formula (I-A) and (I-B) are prepared using aldehydes ALD of the formula (VII b) or (VII a).

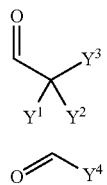

(VIIa)

(VIIb)

A property of these aldehydes ALD is that their radicals $Y^1$, $Y^2$, $Y^3$ and $Y^4$ contain no moieties that are reactive with isocyanate groups; more particularly $Y^1$, $Y^2$, $Y^3$ and $Y^4$ contain no hydroxyl groups, no primary or secondary amino groups and no mercapto groups.

Aldehydes ALD of the formula (VII a) are tertiary aliphatic or tertiary cycloaliphatic aldehydes. Suitable aldehydes ALD of the formula (VII a) are, for example, pivalaldehyde (i.e. 2,2-dimethylpropanal), 2,2-dimethylbutanal, 2,2-diethylbutanal, 1-methylcyclopentanecarboxaldehyde, 1-methylcyclohexanecarboxaldehyde; ethers of 2-hydroxy-2-methylpropanal and alcohols such as propanol, isopropanol, butanol and 2-ethylhexanol; esters of 2-formyl-2-methylpropionic acid or 3-formyl-3-methylbutyric acid and alcohols such as propanol, isopropanol, butanol and 2-ethylhexanol; esters of 2-hydroxy-2-methylpropanal and carboxylic acids such as butyric acid, isobutyric acid and 2-ethylhexanoic acid; and also the ethers and esters, described below as being particularly suitable, of 2,2-disubstituted 3-hydroxypropanals, 3-hydroxybutanals or analogous higher aldehydes, more particularly of 2,2-dimethyl-3-hydroxypropanal.

Particularly suitable aldehydes ALD of the formula (VII a) are on the one hand aldehydes ALD1 of the formula (VIII a), in other words aldehydes ALD of the formula (VII a) with the radical $Y^3$ of the formula (II).

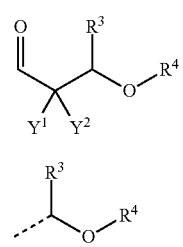

(VIIIa)

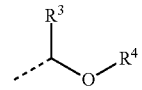

(II)

In the formulae (VIII a) and (II)

$R^3$ is a hydrogen atom or is an alkyl or arylalkyl group, more particularly having 1 to 12 C atoms, and is preferably a hydrogen atom; and $R^4$ is a hydrocarbon radical having 1 to 30, more particularly 11 to 30 C atoms, which where appropriate contains heteroatoms.

Preferably $Y^1$ and $Y^2$ are each a methyl group and preferably $R^3$ is a hydrogen atom.

Aldehydes ALD1 of the formula (VIII a) are ethers of aliphatic, cycloaliphatic or arylaliphatic 2,2-disubstituted 3-hydroxyaldehydes with alcohols or phenols of the formula $R^4$—OH, examples being fatty alcohols or phenol. Suitable 2,2-disubstituted 3-hydroxyaldehydes are obtainable in turn from aldol reactions, especially crossed aldol reactions, between primary or secondary aliphatic aldehydes, more particularly formaldehyde, and secondary aliphatic, secondary cycloaliphatic or secondary arylaliphatic aldehydes, such as, for example, isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde.

Examples of such aldehydes ALD1 of the formula (VIII a) are 2,2-dimethyl-3-phenoxypropanal, 3-cyclohexyloxy-2,2-dimethylpropanal, 2,2-dimethyl-3-(2-ethylhexyloxy)propanal, 2,2-dimethyl-3-lauroxypropanal and 2,2-dimethyl-3-stearoxypropanal.

Particularly suitable aldehydes ALD of the formula (VII a) are on the other hand aldehydes ALD2 of the formula (VIII b), in other words aldehydes ALD of the formula (VII a) with the radical $Y^3$ of the formula (III).

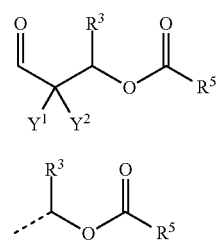

(VIIIb)

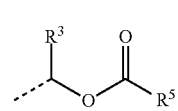

(III)

In the formulae (VIII b) and (III) $R^5$ either is a hydrogen atom, or is a linear or branched alkyl radical having 1 to 30, more particularly 11 to 30, C atoms, where appropriate with cyclic fractions and where appropriate with at least one heteroatom, or is a singly or multiply unsaturated, linear or branched hydrocarbon radical having 5 to 30 C atoms, or is an unsubstituted or substituted, aromatic or heteroatomic 5-membered or 6-membered ring.

Preferably $Y^1$ and $Y^2$ are each a methyl group and $R^3$ preferably is a hydrogen atom.

Aldehydes ALD2 of the formula (VIII b) are esters of the above-described 2,2-disubstituted 3-hydroxy aldehydes, such as 2,2-dimethyl-3-hydroxypropanol, 2-hydroxymethyl-2-methylbutanal, 2-hydroxymethyl-2-ethyl-butanal, 2-hydroxymethyl-2-methylpentanal, 2-hydroxymethyl-2-ethylhexanal, 1-hydroxymethylcyclopentane-carboxaldehyde, 1-hydroxymethyl-cyclohexanecarboxaldehyde 1-hydroxymethylcyclohex-3-enecarboxaldehyde, 2-hydroxymethyl-2-methyl-3-phenylpropanal, 3-hydroxy-2-methyl-2-phenylpropanal and 3-hydroxy-2,2-diphenylpropanal, for example, with suitable carboxylic acids.

Examples of suitable carboxylic acids are on the one hand aliphatic carboxylic acids, such as formic acid, acetic acid, propionic acid, butyric acid, isobutyric acid, valeric acid, caproic acid, 2-ethylcaproic acid, capric acid, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, elaeostearic acid, arachidonic acid, fatty acids from the industrial saponification of natural oils and fats such as, for example, rapeseed oil, sunflower oil, linseed oil, olive oil, coconut oil, oil-palm kernel oil and oil-palm oil, and also technical mixtures of fatty acids which include such acids. Suitable carboxylic acids on the other hand are aromatic carboxylic acids, examples being benzoic acid or the positionally isomeric toluic acids, ethyl- or isopropyl- or tert-butyl- or methoxy- or nitrobenzoic acids.

Preferred aldehydes ALD2 of the formula (VIII b) are 3-benzoyloxy-2,2-dimethylpropanal, 3-cyclohexanoyloxy-2,2-dimethylpropanal, 2,2-dimethyl-3-(2-ethylhexyloxy) propanal, 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal, and also analogous esters of other 2,2-disubstituted 3-hydroxyaldehydes.

In one particularly preferred embodiment $R^5$ is selected from the group consisting of phenyl, cyclohexyl and the $C_{11}$, $C_{13}$, $C_{15}$ and $C_{17}$ alkyl groups.

A particularly preferred aldehyde ALD2 of the formula (VIII b) is 2,2-dimethyl-3-lauroyloxypropanal.

In one preferred method of preparing the aldehyde ALD2 of the formula (VIII b) a 2,2-disubstituted 3-hydroxyaldehyde, 2,2-dimethyl-3-hydroxypropanal for example, which can be prepared, for example, from formaldehyde (or paraformaldehyde) and isobutyraldehyde, where appropriate in situ, is reacted with a carboxylic acid to the corresponding ester. This esterification can take place without the use of solvents by known methods, described for example in Houben-Weyl, "Methoden der organischen Chemie", Vol. VIII, pages 516-528.

Suitable aldehydes ALD of the formula (VII b) are aromatic aldehydes, examples being benzaldehyde, 2- and 3- and 4-tolualdehyde, 4-ethyl- and 4-propyl- and 4-isopropyl-4-butylbenzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- and trialkoxybenzaldehydes, 2-, 3- and 4-nitrobenzaldehyde, 2- and 3- and 4-formylpyridine, 2-furfuraldehyde, 2-thiophenecarbaldehyde, 1- and 2-naphthylaldehyde, 3- and 4-phenyloxybenzaldehyde; quinoline-2-carbaldehyde and its 3-, 4-, 5-, 6-, 7- and 8-position isomers, and also anthracene-9-carbaldehyde.

Suitable aldehydes ALD of the formula (VII b) are additionally glyoxal, glyoxalic esters, methyl glyoxalate for example, cinnamaldehyde and substituted cinnamaldehydes.

In one particularly preferred embodiment the aldehyde ALD of the formula (VII a) is odourless. An "odourless" substance is a substance so low in odour that for the majority of human beings it cannot be smelt, in other words cannot be perceived with the nose.

Odourless aldehydes ALD of the formula (VII a) are on the one hand, more particularly, aldehydes ALD1 of the formula (VIII a) in which the radical $R^4$ is a hydrocarbon radical having 11 to 30 C atoms that where appropriate contains heteroatoms.

On the other hand, odourless aldehydes ALD of the formula (VII a) are more particularly aldehydes ALD2 of the formula (VIII b) in which the radical $R^5$ either is a linear or branched alkyl group having 11 to 30 carbon atoms, where appropriate with cyclic fractions, and where appropriate with at least one heteroatom, more particularly with at least one ether oxygen, or is a singly or multiply unsaturated linear or branched hydrocarbon chain having 11 to 30 carbon atoms.

Examples of odourless aldehydes ALD2 of the formula (VIII b) are esterification products of the aforementioned 2,2-disubstituted 3-hydroxyaldehydes with carboxylic acids such as, for example, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, elaeostearic acid, arachidonic acid, fatty acids from the industrial saponification of natural oils and fats such as, for example, rapeseed oil, sunflower oil, linseed oil, olive oil, coconut oil, oil-palm kernel oil and oil-palm oil, and also technical mixtures of fatty acids which include these acids. Preferred aldehydes of the formula (VIII b) are 2,2-dimethyl-3-lauroyloxypropanal, 2,2-dimethyl-3-myristoyloxypropanal, 2,2-dimethyl-3-palmitoyloxypropanal and 2,2-dimethyl-3-stearoyloxypropanal. Particular preference is given to 2,2-dimethyl-3-lauroyloxypropanal.

Aldimines A of the formula (I-A) and (I-B) which are prepared starting from odourless aldehydes of the particularly preferred embodiments described above are odourless. Odourless aldimines A of this kind are particularly preferred.

The hot-melt adhesive K may comprise further constituents. One particularly preferred further constituent is an acid in the form of an organic monocarboxylic acid or dicarboxylic acid or of an organic monosulphonic acid or disulphonic acid or of a compound which can be hydrolysed to one of these acids.

In one embodiment this acid is an organic monocarboxylic or dicarboxylic acid or a compound which can be hydrolysed to an organic monocarboxylic or dicarboxylic acid, and is selected, for example, from saturated aliphatic monocarboxylic acids such as formic acid, acetic acid, propionic acid, butyric acid, isobutyric acid, valeric acid, isovaleric acid, pivalic acid, caproic acid, oenanthic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, isostearic acid, arachidic acid and behenic acid;

saturated aliphatic dicarboxylic acids such as oxalic acid, malonic acid, succinic acid, glutaric acid, adipic acid, pimelic acid, sorbic acid, azelaic acid, sebacic acid and dodecanedioic acid;

mono- or polyunsaturated aliphatic monocarboxylic or dicarboxylic acids such as palmitoleic acid, oleic acid, erucic acid, sorbic acid, linoleic acid, linolenic acid, elaeostearic acid, ricinolic acid, ricinenic acid, maleic acid, fumaric acid and sorbic acid;

cycloaliphatic monocarboxylic or dicarboxylic acids such as cyclohexanecarboxylic acid, hexahydrophthalic acid, tetrahydrophthalic acid, resin acids and naphthenic acids;

halogenated aliphatic monocarboxylic or dicarboxylic acids such as trichloroacetic acid and 2-chloropropionic acid;

aromatic monocarboxylic or dicarboxylic acids such as benzoic acid, salicylic acid, gallic acid, phthalic acid, terephthalic acid, isophthalic acid and the positionally isomeric toluic acids, methoxybenzoic acids, chlorobenzoic acids and nitrobenzoic acids;

technical carboxylic acid mixtures such as, for example, Versatic® acids;

carboxylic anhydrides such as phthalic anhydride and hexahydrophthalic anhydride;

silyl esters of the stated organic carboxylic acids, examples being silicone tetraacetate, trimethylsilyl acetate, triacetoxyethyl acetate, trimethylsilyl laurate and trimethylsilyl benzoate.

In a further embodiment this acid is an organic monosulphonic or disulphonic acid or a compound which can be hydrolysed to an organic monosulphonic or disulphonic acid, and is selected, for example, from aliphatic or aromatic monosulphonic and disulphonic acids such as methylsulphonic acid, vinylsulphonic acid, butylsulphonic acid, sulphoacetic acid, benzenesulphonic acid, the positionally isomeric benzenedisulphonic acids, p-toluenesulphonic acid, p-xylenesulphonic acid, 4-dodecylbenzenesulphonic acid, 1-naphthalenesulphonic acid, dinonylnaphthalenesulphonic acid and dinonylnaphthalenesulphonic acid;

alkyl or silyl esters of the stated monosulphonic or disulphonic acids, examples being methyl p-toluenesulphonate, ethylene glycol bis-p-toluenesulphonate, trimethylsilyl methanesulphonate and trimethylsilyl benzenesulphonate;

sultones and anhydrides, examples being 1,4-butanesultone and 2-sulphobenzoic anhydride.

This acid may also comprise mixtures of two or more of the stated acids or compounds which can be hydrolysed to these acids.

Preferred such acids are aromatic monocarboxylic acids, more particularly benzoic acid, salicylic acid and 2-nitrobenzoic acid.

This acid is typically present in the form of an organic monocarboxylic or dicarboxylic acid or of an organic monosulphonic or disulphonic acid or of a compound which can be hydrolysed to one of these acids, in an amount of 0.001% to 5% by weight, preferably 0.005% to 2% by weight, based on the hot-melt adhesive K.

This acid has a catalytic effect on the hydrolysis of the aldimine A, thereby accelerating the crosslinking of the hot-melt adhesive K.

The hot-melt adhesive K comprises, where appropriate, further constituents of the kind typically used in accordance with the state of the art. To a person skilled in the art it is clear here that such further constituents are to be chosen, in terms of their nature and amount, and as a function of the respective composition, such that in spite of their presence the storage stability of the composition is assured.

Where appropriate, the hot-melt adhesive K comprises non-reactive thermoplastic polymers, such as homopolymers or copolymers of unsaturated monomers, for example, more particularly from the group encompassing ethylene, propylene, butylene, isobutylene, isoprene, vinyl acetate or higher esters thereof, and (meth)acrylate. Particularly suitable are ethylene-vinyl acetate copolymers (EVA), atactic poly-α-olefins (APAO), polypropylenes (PP) and polyethylenes (PE).

Where appropriate the hot-melt adhesive K comprises catalysts for the reaction of the isocyanate groups, such as metal compounds or tertiary amines.

Examples of suitable metal compounds include tin compounds such as butyltin diacetate, dibutyltin dilaurate, dibutyltin distearate, dibutyltin diacetylacetonate, dioctyltin dilaurate, dibutyltin dichloride, dibutyltin oxide, tin(II) carboxylates; stannoxanes such as laurylstannoxane; and bismuth compounds such as bismuth(III) octoate, bismuth(III) neodecanoate or bismuth(III) oxinates.

Examples of suitable tertiary amines include 2,2'-dimorpholinodiethyl ether and other morpholine ether derivatives, 1,4-diazabicyclo[2.2.2]octane and 1,8-diazabicyclo[5.4.0]undec-7-ene.

The hot-melt adhesive K may also comprise mixtures of the stated catalysts. Particularly suitable are mixtures of metal compounds and tertiary amines.

Where appropriate the hot-melt adhesive K comprises reactive diluents or crosslinkers, examples being oligomers or polymers of diisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate, 1,3- and 1,4-tetramethylxylylene diisocyanate, more particularly isocyanurates, carbodiimides, uretonimines, biurets, allophanates and iminooxadiazinediones of the stated diisocyanates, adducts of polyisocyanates with short-chain polyols, and also adipic dihydrazide and other dihydrazides, and also further blocked amines such as oxazolidines, enamines or ketimines.

The hot-melt adhesive K may further comprise other additives, such as, more particularly, fillers, plasticizers, adhesion promoters, more particularly compounds containing silane groups, UV absorbers, UV or heat stabilizers, antioxidants, flame retardants, optical brighteners, pigments, dyes, and drying agents, and also further substances typically used in isocyanate-containing compositions.

In one preferred embodiment the hot-melt adhesive K is free of carbon black.

In another preferred embodiment the hot-melt adhesive K is entirely free of fillers.

With particular preference the hot-melt adhesive K is free, or at least substantially free, of plasticizers and solvents.

In one particularly preferred embodiment the above-described hot-melt adhesive K is transparent. In particular it is transparent both before and after crosslinking with moisture. A hot-melt adhesive K of this kind is particularly suitable for the bonding of substrates where at least one of the substrates to be bonded is transparent or translucent.

The above-described hot-melt adhesive K is prepared and stored in the absence of moisture. In a suitable pack or arrangement impervious to ambient conditions, such as in a drum, pouch or cartridge, for example, it possesses outstanding storage stability. The terms "storage-stable" and "storage stability" in connection with a composition or an adhesive refer in the present document to the fact that the viscosity of the composition or of the adhesive, at the application temperature, given suitable storage, does not increase within the time span under consideration or during that time increases only to such an extent that the composition or the adhesive remains suitable for use in the manner intended.

For the mode of action of a reactive hot-melt adhesive it is important that the adhesive K can be melted, in other words that at the application temperature it has a sufficiently low viscosity in order to be able to be applied, and that on cooling it very quickly develops a sufficient bond strength even before the crosslinking reaction with water, more particularly in the form of atmospheric moisture, is concluded (initial strength). It has emerged that at the application temperature, which for hot-melt adhesives is in the range from 80° C. to 200° C., typically from 120° C. to 160° C., the hot-melt adhesive K described exhibits a viscosity which allows convenient handling and that on cooling it develops good bond strength with sufficient rapidity. A viscosity that allows convenient handling is more particularly a viscosity of 1-50 Pa·s.

The laminate can be obtained, for example, by a process as described below.

In a further aspect the present invention provides a process for the adhesive bonding of a plasticizer-containing plastic, comprising the steps of i) melting a hot-melt adhesive K of the kind already described above ii) applying the melted hot-melt adhesive K to a substrate S1 iii) contacting the surface of a substrate S2 with the hot-melt adhesive K within its open time;

or i') melting a hot-melt adhesive K of the kind already described above ii') applying the melted hot-melt adhesive K to a substrate iii') cooling the hot-melt adhesive K to room temperature iv') melting the hot-melt adhesive K located on the substrate S1 v') contacting the surface of a substrate S2 with the hot-melt adhesive K;

or i") melting a hot-melt adhesive K of the kind already described above ii") applying the melted hot-melt adhesive K into a gap confined laterally substantially by the surfaces of the substrate S1 and the substrate S2.

It is essential here that at least one of the substrates S1 and/or S2 is a plasticizer-containing plastic and the substrate S1 is composed of the same material as or a different material to the substrate S2. The substrates S1 and S2 have already been described above in the description of the laminate.

Typically step iii) or v') or ii") is followed by a step of crosslinking by reaction of the isocyanate groups of the hot-melt adhesive K under the influence of water, more particularly in the form of atmospheric moisture.

The melted hot-melt adhesive K can be applied in any of a wide variety of different ways, as for example by a spraying, spreading, knife-coating, die application, roll application or casting application process.

In the first two variants of this process the melted hot-melt adhesive K is applied to a substrate S1. This substrate S1 is more particularly a film of a plasticizer-containing plastic, more particularly a pPVC film. This produces, therefore, a coated polymeric film, which likewise constitutes one aspect of the present invention.

In one embodiment, after cooling to room temperature, this film can be used as an intermediate in the form of a coated film. The cooling can be accelerated by using a cooling means, a fan for example, more particularly an air fan, for cooling. The coated polymeric film thus produced can then, in accordance with requirements, be cut to length, cut up, rolled up or further processed directly. The rolls of the coated polymeric films can then, in accordance with what is required, be stored or transported. In the case of rolling it is possible here to use release paper interleaves in order to prevent parts of the film that lie against one another—as a result of the rolling—coming into direct contact with one another. It has nevertheless been found that in many cases it is possible to do without the use of such release paper interleaves, and that blocking—as it is known—of the rolled film does not occur even after prolonged storage or transport times. For more prolonged storage, however, it is of very great advantage if this coated film is protected from the ingress of water. This can be achieved, for example, by means of a moisture-tight pack, such as a welded polymeric film or aluminium pouch, for example, with the interior advantageously being evacuated or filled with inert gas prior to sealing. Thus, for example, the coated polymeric film can be coated at the premises of the film manufacturer, and can be subsequently stored and supplied to the site or to the plant at which this precoated film is then bonded to a support. In spite of this time span, in certain circumstances long, between coating and processing, a flawless adhesive bond can be ensured. This may be of great advantage on account more particularly of the fact that within the industry, particularly in vehicle production, there is a trend observable in manufacture "away from the line and toward the supplier". This trend is continued in turn between the direct supplier—of car doors, for example—and its supplier—of decorative materials, for example—as well. To a person skilled in the art it is clear that under certain conditions it may nevertheless be advantageous to use interleaves of a release paper.

In the short term, i.e. up to a few hours, a coated polymeric film can often be stored even without such a pack, and used further.

The coated polymeric films thus produced can then be further bonded, by heating the coated film, or the hot-melt adhesive K located on it, or partly or wholly melting it, in accordance with step iv'), and then contacting it with the surface of a substrate S2, in accordance with step v') in the process described above.

After the contacting of the adhesive with the surface of the substrate S2, i.e. after step iii), v') or ii"), respectively, the hot-melt adhesive K cools and undergoes solidification. This solidification produces an initial strength, allowing small forces between the substrates to be transmitted even at this stage and, in certain circumstances, allowing slipping of a substrate to be prevented and transportation to take place. As a result of the reaction of water with the adhesive, the adhesive is crosslinked, leading to the development of the ultimate strength and the heat resistance. The reaction with water begins as soon as the adhesive comes into contact with atmospheric moisture—in other words, generally speaking, right at the beginning of the application. The ultimate strength is attained when the crosslinking has run its full course; this may take a very wide range of times, typically several days, and is heavily dependent on the climatic conditions, the substrates, the bond strength and the bonding geometry.

This process of adhesive bonding results in an article. The article thus formed is advantageously an article of industrial manufacture and more particularly is an article for interior fitment. Preferably it is a part for installation in a means of transport, or is used in the furniture sector.

Particular importance attaches to the use of the coated polymeric film, and of the process described, respectively, for the production of interior trim parts of vehicles, more particularly of cars. Examples of such interior trim parts are door side parts, switch panels, parcel shelves, roof panel linings, sliding-roof panel linings, centre consoles, glove boxes, sun visors, pillars, door handles, arm rests, floor assemblies, loading-floor assemblies and boot assemblies, and also sleeping-cab walls and rear walls of vans and lorries.

Used for this purpose more particularly is a vacuum forming process or a press lamination in the sealing process.

In the case of the vacuum forming process, the hot-melt adhesive K can be applied to the substrate S2, also referred to as a support, or else a polymeric film coated with hot-melt adhesive K can be employed. Typically the polymeric film (decorative element of air-impermeable material), more particularly of pPVC, is clamped in an airtight manner into a frame. Beneath the film there is a bottom mould, onto which the support is placed. Bottom mould and support have drill holes or are air-permeable. The apparatus is closed off in an airtight manner as well toward its bottom. Before the vacuum or reduced pressure is applied, the decorative material is heated, typically to a temperature of about 160° C., so that the film becomes soft and the hot-melt adhesive undergoes complete or partial melting. When the air is withdrawn from this device under suction, the decorative material then conforms accurately to the support component, under the atmospheric pressure bearing on the surface of the material, and is bonded to the said component. On account of the vacuum, or reduced pressure, that is to be produced, the decorative material is air-impermeable. In the case of vacuum forming it is also possible to use a polymeric film, coated as above with hot-melt adhesive K, and made more particularly of pPVC, which is heated prior to contacting, or prior to the application of the vacuum.

In the case of the press lamination process, the hot-melt adhesive K can likewise be applied to the support, or to the decorative element, i.e. the polymeric film, beforehand. The bonding of the support to the decorative element is accomplished, following thermal activation by means, for example, of an array of IR ray lamps to a temperature of typically above 80° C., so that the adhesive melts at least partially, with joining and pressing (joining temperature >50° C.).

The films utilized here, comprising a plasticizer-containing plastic, are in many cases decorative films and have a surface texture. This surface texture on the polymeric film may be introduced by embossing before, during or after the bonding operation.

The support is preferably a plastic which contains no plasticizer. Particularly preferred supports are supports of polycarbonate (PC) or acrylonitrile-butadiene-styrene copolymer (ABS) or of a PC/ABS blend or of a PC/ABS composite.

In a very preferred embodiment, therefore, the article formed is a support laminated with pPVC film.

In a further preferred embodiment the process is used for bonding two films, with at least one and preferably both films composed of a plasticizer-containing plastic, more particularly of pPVC. With particular preference it is used for the bonding of two pPVC films. It is particularly suitable for the bonding of sealing membranes, of the kind used typically to seal tunnels, roofs or swimming pools, which have a thickness of typically 1 to 3 mm, in special cases even up to 5 mm. Films of this kind are typically bonded with overlapping at the edges. Accordingly, the processes shown also find use in civil engineering and construction, and the resulting article may be an article of civil engineering or construction.

Films bonded in this way exhibit a sharp reduction in film embrittlement in the region of the bond.

It has emerged that, in the case of the bonds described with the hot-melt adhesive K, sharply improved adhesion values on the part of the adhesive assembly have been achieved, and that, in particular, the adverse effect on the adhesive and the laminate from storage under hot/humid or alternating conditions has been greatly improved and it has been possible to achieve a significant reduction in the migration of the plasticizer from the plasticizer-containing plastic into the adhesive.

BRIEF DESCRIPTION OF THE DRAWINGS

In the text below the invention is illustrated further schematically with reference to drawings. Identical elements in the various figures are given the same reference symbols. Movements are indicated with arrows. The structures shown by the figures are as follows:

FIG. 1 Structure of a laminate

FIG. 2 Structure of a polymeric film coated with hot-melt adhesive K

FIG. 1a shows a laminate 1 which is composed of a substrate S1 3 (first substrate), a substrate S2 4 (second substrate) and a hot-melt adhesive K 5, the adhesive K 5 being in contact with the surfaces of the two substrates S1 3 and S2 4 and producing an adhesive bond between the substrates. In the representation shown here, the two substrates are both flat. An example of the embodiment of a laminate that is shown here is a bond of two polymeric films, more particularly of two pPVC films, by means of an adhesive K.

FIG. 1b shows a laminate 1 which is composed of a substrate S1 3 (first substrate), a substrate S2 4 (second substrate) and a hot-melt adhesive K 5, the adhesive K 5 being in contact with the surfaces of the two substrates S1 3 and S2 4 and producing an adhesive bond between the substrates. In the representation shown here, the substrate S1 3 is of flat design. An example of the embodiment of a laminate that is shown here is the lamination of a support S2 4 to a plasticizer-containing polymeric film S1 3, preferably a pPVC film, by means of an adhesive K 5.

FIG. 2a shows a polymeric film 2 coated with a hot-melt adhesive K 5. In this case the hot-melt adhesive K 5 has been applied in layer form to a polymeric film S1 3.

FIG. 2b shows schematically the production of a coated polymeric film 2. In the embodiment shown here, the hot-melt adhesive K 5 is applied by means of applicator unit 6 to the polymeric film S1 3 in the form of a layer. In this case the polymeric film is moved beneath the applicator unit 6. The polymeric film is typically unwound from a roll (not shown). Following its application, the melted adhesive K 5 is cooled by means of cooling means 7 (an air blower, for example). FIG. 2b also shows that this coated polymeric film 2 is rolled up. Moreover, in the bottom part of FIG. 2b, there is an enlarged schematic cutout shown of a roll 8 of rolled-up coated polymeric film 2. As a result of the rolling-up of the coated polymeric film, the individual plies of the coated polymeric film 2 are in direct contact with one another and more particularly have no release paper interleaves. As and when required, the coated polymeric film can be unwound from the roll 8 without blocking, even after prolonged storage or transport time.

Figure 1A:
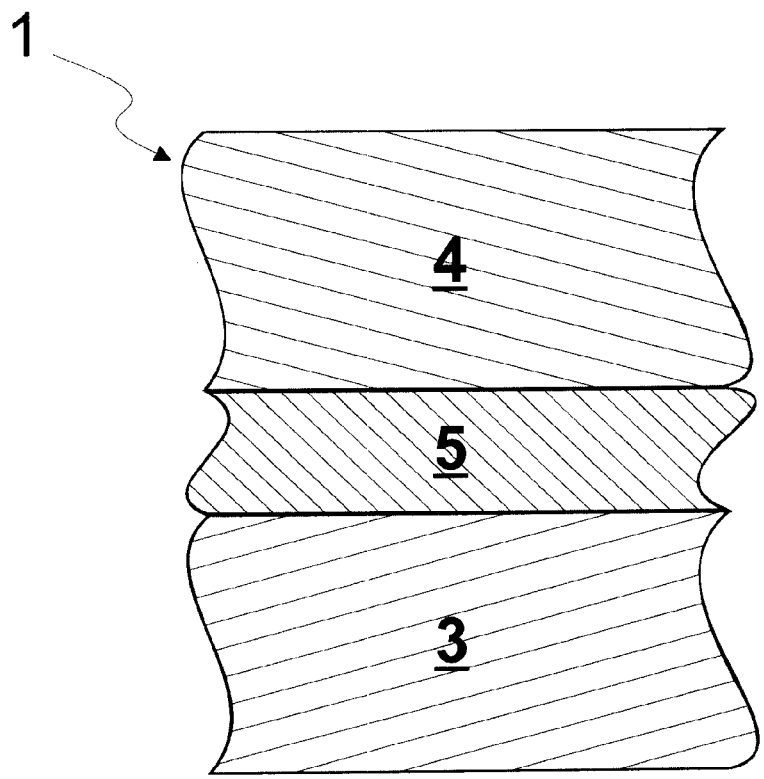
FIG. 1a shows a schematic cross section through a laminate with two flat substrates S1 and S2
Figure 1B:
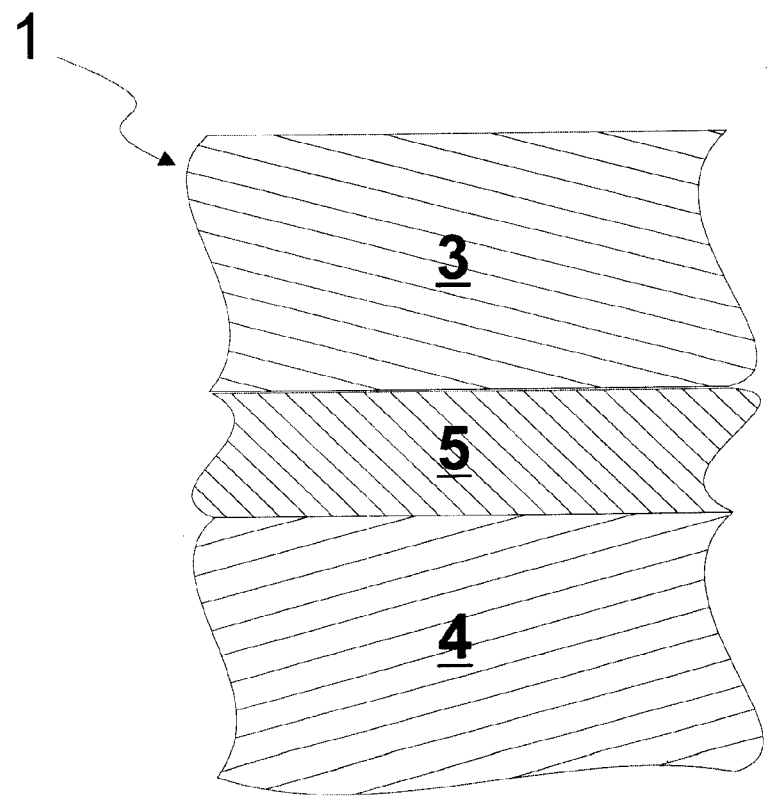
FIG. 1b shows a schematic cross section through a laminate with one flat substrate S1
Figure 2A:
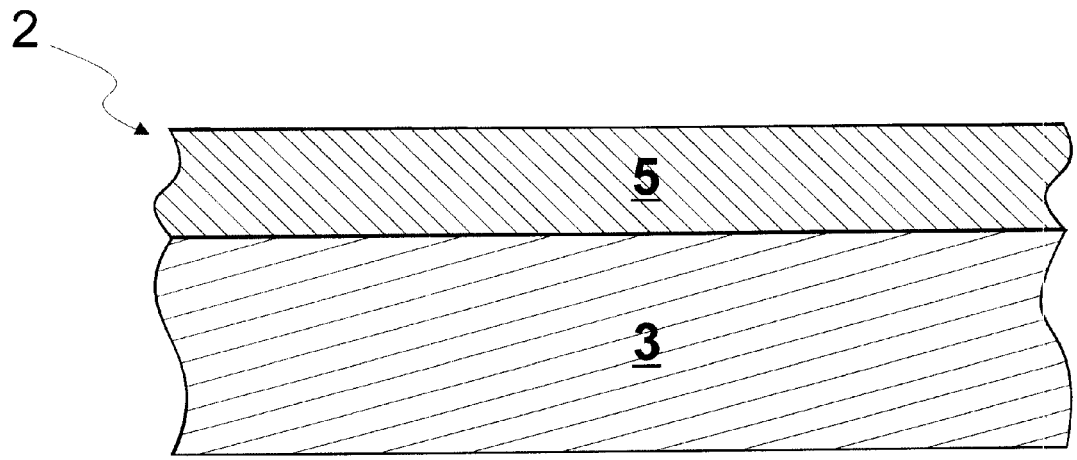
FIG. 2a shows a schematic cross section through a polymeric film coated with hot-melt adhesive K
Figure 2B:
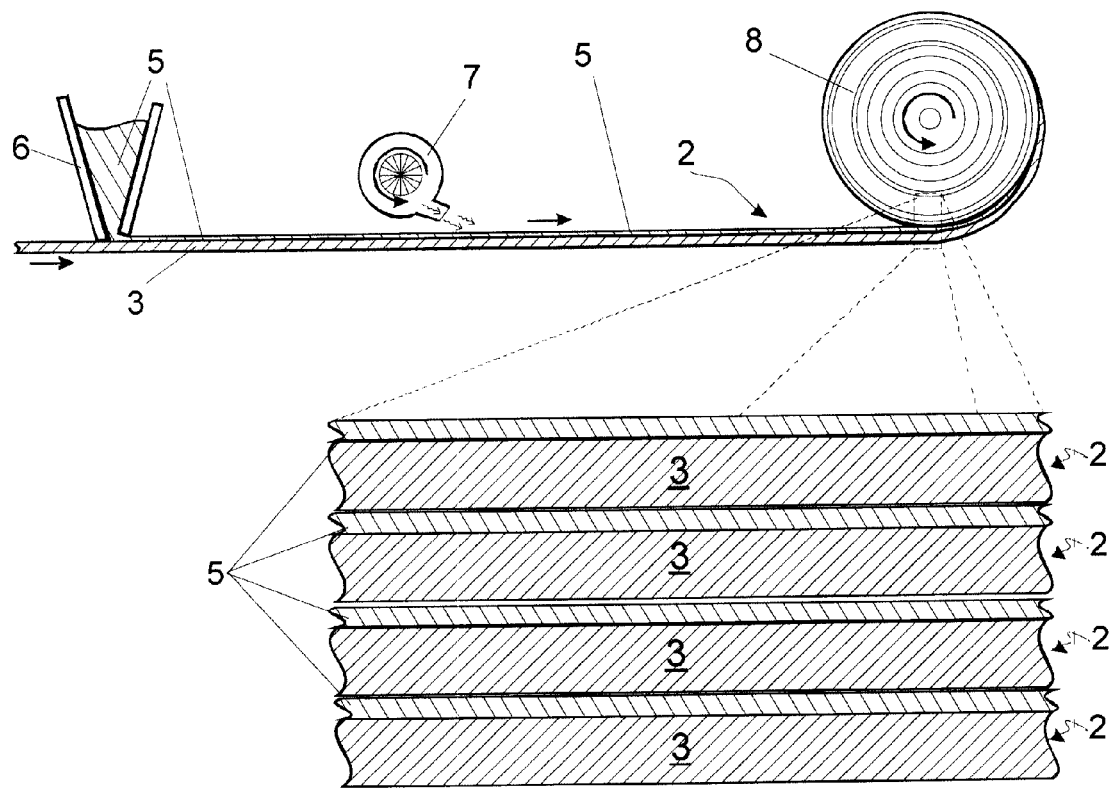
FIG. 2b shows a cross section through a schematic preparation process for a polymeric film coated with hot-melt adhesive K.

A coated polymeric film 2 of this kind is heated as and when required, so that it, or the hot-melt adhesive K 5, becomes soft or at least is partially melted and is contacted with a substrate S2 4 and typically bonded under pressure, thus producing a laminate 1 as shown in FIG. 1b.

| List of reference symbols | |
|---|---|
| 1 | laminate |
| 2 | coated polymeric film |
| 3 | substrate S1 |
| 4 | substrate S2 |
| 5 | hot-melt adhesive K |
| 6 | applicator unit |
| 7 | cooling means |
| 8 | roll of coated polymer film 2 |

EXAMPLES

Preparation of Aldimines
Aldimine A-1

A round-bottomed flask was charged under a nitrogen atmosphere with 74.3 g (0.26 mol) of distilled 2,2-dimethyl-3-lauroyloxypropanal. With vigorous stirring, from a dropping funnel, 30.0 g (0.25 mol N) of polyetherdiamine (polyoxypropylenediamine having an average molecular weight of about 240 g/mol; Jeffamine® D-230, Huntsman; amine content 8.29 mmol N/g) were added slowly, in the course of which the mixture underwent heating and increasing clouding. Thereafter the volatile constituents were removed under vacuum (10 mbar, 80° C.). Yield: 99.5 g of a clear, pale yellow oil having an amine content of 2.50 mmol N/g.

Aldimine A-2

A round-bottomed flask was charged under a nitrogen atmosphere with 28.06 g (0.099 mol) of distilled 2,2-dimethyl-3-lauroyloxypropanal. With vigorous stirring, from a dropping funnel, 10.00 g (0.095 mol) of 2-(2-aminoethoxy) ethanol (Diglycolamine® Agent; Huntsman) were added over the course of 3 minutes, in the course of which the temperature of the reaction mixture rose to 40° C. Thereafter the volatile constituents were removed under vacuum (10 mbar, 80° C.). Yield: 36.3 g of a colourless, clear and odourless liquid of low viscosity at room temperature, having an amine content of 2.58 mmol N/g.

Preparation of Hot-Melt Adhesives

The experiments below were carried out using SikaMelt®-9633/61, available commercially from Sika Automotive GmbH, Hamburg, (referred to below as '9633/61'), to which was added, where appropriate, the amount of aldimines indicated in Table 1, addition taking place to the melt, with stirring and under nitrogen. SikaMelt®-9633/61 is a hot-melt adhesive which contains a mixture of prepolymers containing isocyanate groups, based on a polyester polyol which is solid at room temperature and on a polyester polyol which is liquid at room temperature, and MDI as polyisocyanate, and which is plasticizer-free.

The aldimine in Examples 1 and 2 (aldimine A-1) corresponds to the formula (I-A). The aldimine (aldimine A-2) in Example 3 reacts in situ with the polyurethane polymer containing isocyanate groups that is present in the hot-melt adhesive, to form in situ an aldimine conforming to the formula (I-B).

Measurement Methods
Viscosity:

After the respective hot-melt adhesive had been melted in a closed tube in an oven at 140° C. for 20 minutes, 12.3 mg of adhesive were weighed out into a disposable sleeve and conditioned for 20 minutes in the viscometer at the respective temperature indicated in Table 1. The viscosity was measured at 1 or 5 or 10 revolutions per minute (rpm) on a Brookfield DV-2 Thermosel viscometer with spindle No. 27. The viscosity selected is the figure which applies after 5 minutes' measurement.

Open Time:

The open time was determined as follows: the melted adhesive was drawn down onto silicone-coated paper using a coating bar in a thickness of 500 µm and at a temperature of 150° C. This test specimen was subsequently placed on a surface at room temperature. As soon as a paper strip pressed gently onto the adhesive could be parted from the adhesive, the open time was over. Subsequently the adhesive cured in each case and became solid.

Through-Curing 500 µm:

After the respective hot-melt adhesive had been melted in a closed tube in an oven at 150° C. for 20 minutes, the adhesive was drawn down onto silicone-coated paper by means of a coating bar in a thickness of 500 µm. The film was stored at 55% relative humidity and room temperature. At regular intervals a portion of the film of adhesive was placed on the hot plate and inspected. The point in time of storage at which melting was no longer observable, because the adhesive had cured, was reported as the through-cure time.

Strength after 30 Min (Initial Strength):

After the respective hot-melt adhesive had been melted in a closed tube in an oven at 150° C. for 20 minutes, tensile shear test specimens were produced as follows: the adhesive was applied to one side of a wooden test element (100 mm×25 mm*5 mm); by gentle pressure this element was pressed onto the other wooden test element, and the bond was fixed with a 500 g weight. The bond area was 25 mm×25 mm and the thickness of adhesive was 1 mm. After 30 minutes' storage at 55% relative humidity and room temperature, the tensile shear strength was ascertained and has been reported in Table 1 as "strength after 30 min".

Tensile Strength/Extension

The tensile strength and the breaking extension were determined in a method based on DIN 53504 on test specimens with a layer thickness of 500 µm and dimensions of 120 mm×20 mm. The films for producing the test specimens were applied at an adhesive temperature of 140° C. and then stored for 2 weeks at 23° C. and 50% relative humidity.

Additionally the tensile strengths/extensions were determined after storage for 7 days at 90° C. and 100% relative humidity, or in accordance with BMW test 3.08, and reported in Table 1. The % figures for the values after hot/humid or alternating storage are based on the values measured without hot/humid or alternating storage.

Roller Peel Strength

The roller peel strength (RPS) (90°) was determined in accordance with DIN 53 289 with a pulling speed of 80 mm/min on a Zwick test instrument (Zwick Z2.5). Curing and storage are as indicated for the tensile strength and extension.

TABLE 1

Hot-melt adhesives and results.

| | Ref. 1 | 815 1 | 806 2 | 823 3 |
|---|---|---|---|---|
| 9633/61 [parts by weight] | 100 | 100 | 100 | 100 |
| A-1 [parts by weight] | — | 9.5 | 10.5 | |
| A-2 [parts by weight] | — | | | 9.2 |
| Viscosity (110° C., 1 rpm) [mP · s] | 97 000 | 69 500 | 89 000 | 173 000 |

TABLE 1-continued

Hot-melt adhesives and results.

| | Ref. 1 | 815 / 1 | 806 / 2 | 823 / 3 |
|---|---|---|---|---|
| Viscosity (130° C., 5 rpm) [mP · s] | 29 700 | 31 500 | 39 600 | 93 000 |
| Viscosity (150° C., 10 rpm) [mP · s] | 16 100 | 16 500 | 19 000 | 45 000 |
| Open time | 35 sec | 25 sec | 15-20 sec | 40 sec |
| Through-curing 500 μm | 27 h | 27 h | ~28 h | n.m.* |
| Shore A hardness | 96 | 90 | 90 | n.m.* |
| Shore D hardness | 57 | 37 | 30 | n.m.* |
| Strength after 30 min [MPa] | 0.35 | 0.31 | 0.20 | n.m.* |
| Tensile strength [MPa] | 20.9 | 16.5 | 18.9 | n.m.* |
| Breaking extension [%] | 540 | 790 | 750 | n.m.* |
| Tensile strength (7 d, 90%, 100% r.h.)[MPa] | 4.3 (21%) | 9.2 (58%) | 9.8 (52%) | n.m.* |
| Breaking extension (7 d, 90%, 100% r.h.) [%] | 35 (6%) | 40 (5%) | 190 (25%) | n.m.* |
| Tensile strength (BMW 3.08) [MPa] | 15.6 (75%) | 20.5 (124%) | 16.1 (85%) | n.m.* |
| Breaking extension (BMW 3.08) [%] | 510 (94%) | 750 (95%) | 535 (74%) | n.m.* |
| RPS** (100° C.) (BMW 3.08) [N/cm] | 0.00 | 1.05 | 0.34 | 3.34 |

*n.m. = not measured
**RPS = roller peel strength

Additionally, laminates were produced by means of a thermoforming or press lamination process.

In the case of the thermoforming lamination, the pPVC film was roll-coated with the respective adhesive at a temperature of 140° C. and a speed of 5 m/minute, with an application rate of 95 g/m². This coated film was applied by vacuum to an ABS support (joining temperature 75-80° C., laminating time 30 seconds, cooling to 40° C. before demoulding). The samples thus laminated were stored for 7 days at 55% relative humidity and 23° C. Alternating storage took place for 10 days in accordance with the BMW 3.08 alternating-conditions test.

In the case of the press lamination, the respective melted hot-melt adhesive was knife-coated at 150° C. as a transfer film in a thickness of 100 μm onto silicone paper. Subsequently the film of adhesive was transferred to a pPVC film at 150° C. Following reactivation of the adhesive by heating to a temperature of 150° C. for 20 seconds, the coated PVC film was pressed onto an ABS support (plate above and below heated to 90° C. in each case, pressing time 10 seconds under pressing force of 1000N). The samples thus laminated were stored for 7 days at 55% relative humidity and 23° C. The alternating storage took place for 10 days in accordance with BMW 3.08 alternating-conditions test.

These laminates thus produced were subjected to a determination of their roller peel strength.

TABLE 2

Roller peel strengths of ABS supports laminated with pPVC films, produced by thermoforming or press lamination, at different forming temperatures and after storage under different conditions.

| | Thermoforming lamination | | Press lamination | |
|---|---|---|---|---|
| | Ref. 1 | 1 | Ref. 1 | 1 |
| RPS*(23° C.) [N/cm] | 22 | 37.8 | 7.4 | 9.8 |
| RPS* (100° C.) [N/cm] | 5.6 | 6.5 | 3.5 | 11.4 |
| RPS* (23° C.) (BMW 3.08) [N/cm] | 30 | 39 | 16 | 48 |
| RPS*(100° C.) (BMW 3.08) [N/cm] | 1.1 | 2.7 | 0.2 | 8 |

*RPS = roller peel strength

The results of Tables 1 and 2 show that the hot-melt adhesives containing polyaldimine exhibit significantly better roller peel strengths with the plasticizer-containing PVC substrates than do the corresponding hot-melt adhesives without polyaldimine. It is apparent, moreover, that the adverse effect of hot/humid or alternating storage on the mechanical properties can be greatly reduced through the use of polyaldimines in the adhesives.

The invention claimed is:

1. A laminate comprising
   a) at least one substrate S1;
   b) at least one hot-melt adhesive K comprising
      at least one polyurethane polymer P which contains isocyanate groups and is solid at room temperature, and
      at least one aldimine A; and
   c) at least one substrate S2,
   the substrate S1 and/or the substrate S2 being a plasticizer-containing plastic,
   the substrate S1 and/or the substrate S2 having been pretreated, where appropriate, with a primer, and
   the substrate S1 being joined to the substrate S2 via the hot-melt adhesive K,
   wherein
      the hot-melt adhesive K reduces a gradual loss of adhesion between the adhesive and the substrate that is the plasticizer-containing plastic as compared to a same hot melt adhesive that does not contain the at least one aldimine A, wherein
      the aldimine A has formula (I-A):

(I-A)

wherein $X^P$ is a polyamine having w primary amino groups following removal of w primary amino groups,
w is an integer of from 2 to 8, and Y is a radical of formula (I a) or formula (I b):

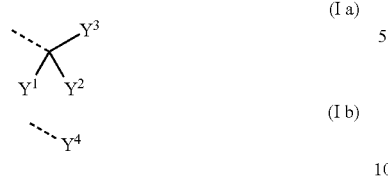

wherein $Y^1$ and $Y^2$ are either
independently of one another, each a monovalent hydrocarbon radical having 1 to 12 C atoms, or
together, a divalent hydrocarbon radical having 4 to 20 C atoms that is part of an unsubstituted or substituted carbocyclic ring having 5 to 8 C atoms;
$Y^3$ is a monovalent hydrocarbon radical that optionally has at least one heteroatom; and
$Y^4$ is either
a substituted or unsubstituted aryl or heteroaryl group that has a ring size of 5 to 8 atoms, or

wherein $R^1$ is a hydrogen atom, an alkoxy group, or is a substituted or unsubstituted alkenyl or arylalkenyl group having 1 to 30 C atoms, and
the polyurethane polymer P is prepared from at least one polyisocyanate and a mixture of at least one amorphous polyester diol with at least one polyester diol that is liquid at room temperature.

2. The laminate according to claim 1, wherein the substrate S1 and/or the substrate S2 is plasticized polyvinyl chloride (pPVC).

3. The laminate according to claim 1, wherein that the substrate S1 and/or the substrate S2 is a polycarbonate (PC), an acrylonitrile-butadiene-styrene copolymer (ABS), a PC/ABS blend, or a PC/ABS composite.

4. The laminate according to claim 1, wherein the polyamine deriving from the radical $X^P$ is selected from the group consisting of 1,6-hexamethylenediamine, 1,5-diamino-2-methylpentane (MPMD), 1,3-diaminopentane (DAMP), 1-amino-3-aminomethyl-3,5,5-trimethylcyclohexane (i.e. isophoronediamine or IPDA), 2,2,4-trimethylhexamethylenediamine, 2,4,4-trimethylhexamethylenediamine, 4-aminomethyl-1,8-octanediamine, 1,3-xylylenediamine, 1,4-xylylenediamine, 1,3-bis(aminomethyl)cyclohexane, 1,4-bis(aminomethyl)cyclohexane, bis-(4-aminocyclohexyl)methane, bis-(4-amino-3-methylcyclohexyl)methane, 3(4),8(9)-bis(aminomethyl)tricyclo[5.2.1.0$^{2,6}$]decane, 1,2- diaminocyclohexane, 1,3-diaminocyclohexane, 1,4-diaminocyclohexane, polyoxyalkylene-diamines, polyoxyalkylene-triamines, and mixtures of two or more of the aforementioned polyamines.

5. The laminate according to claim 1, wherein Y is the radical of the formula (I a).

6. The laminate according to claim 1, wherein $Y^1$ and $Y^2$ are each methyl.

7. The laminate according to claim 1, wherein $Y^3$ is a radical of formula (II) or formula (III):

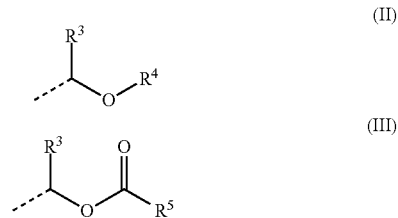

wherein $R^3$ is a hydrogen atom or is an alkyl or arylalkyl group;
$R^4$ is a hydrocarbon radical having 1 to 30 C atoms that optionally contains heteroatoms; and
$R^5$ either
is a hydrogen atom, or
is a linear or branched alkyl radical having 1 to 30 C atoms, optionally with cyclic fractions and optionally with at least one heteroatom, or
is a singly or multiply unsaturated, linear or branched hydrocarbon radical having 5 to 30 C atoms, or
is an unsubstituted or substituted, aromatic or heteroaromatic 5-or6-membered ring.

8. The laminate according to claim 1, wherein the hot-melt adhesive K is substantially free from plasticizers.

9. The laminate according to claim 1, wherein the hot-melt adhesive K has been crosslinked under the influence of water.

10. A coated polymeric film obtained by applying a hot-melt adhesive K in a melted state to a film of a plasticizer-containing plastic, wherein the hot-melt adhesive K comprises at least one aldimine A and at least one polyurethane polymer P that contains isocyanate groups and is solid at room temperature, wherein
the hot-melt adhesive K reduces a gradual loss of adhesion between the adhesive and the plasticizer-containing plastic as compared to a same hot melt adhesive that does not contain the at least one aldimine A,
wherein the aldimine A has formula (I-A):

wherein $X^P$ is a polyamine having w primary amino groups following removal of w primary amino groups.,
w is an integer of from 2 to 8, and
Y is a radical of formula (I a) or formula (I b):

wherein $Y^1$ and $Y^2$ are either
independently of one another, each a monovalent hydrocarbon radical having 1 to 12 C atoms, or together, a divalent hydrocarbon radical having 4 to 20 C atoms that is part of an unsubstituted or substituted carbocyclic ring having 5 to 8 C atoms:

$Y^3$ is a monovalent hydrocarbon radical that optionally has at least one heteroatom; and $Y^4$ is either
a substituted or unsubstituted aryl or heteroaryl group which has a ring size of 5 to 8 atoms, or

wherein $R^1$ is a hydrogen atom, an alkoxy group, or is a substituted or unsubstituted alkenyl or arylalkenyl group having 1 to 30 C atoms, and the polyurethane polymer P is prepared from at least one polyisocyanate and a mixture of at least one amorphous polyester diol with at least one polyester diol that is liquid at room temperature.

11. A process for adhesive bonding of a plasticizer-containing plastic, comprising the steps of:
i) melting a hot-melt adhesive K,
ii) applying the melted hot-melt adhesive K to a substrate S1, and
iii) contacting the surface of a substrate S2 with the hot-melt adhesive K within its open time; or
i') melting the hot-melt adhesive K,
ii') applying the melted hot-melt adhesive K to the substrate S1,
iii') cooling the hot-melt adhesive K to room temperature,
iv') melting the hot-melt adhesive K located on the substrate S1, and
v') contacting the surface of the substrate S2 with the hot-melt adhesive K; or
i") melting the hot-melt adhesive K, and
ii") applying the melted hot-melt adhesive K into a gap confined laterally substantially by the surfaces of the substrate S1 and the substrate S2;
wherein at least one of the substrates S1 or S2 is a plasticizer-containing plastic;
the substrate S1 is composed of the same material as or a different material to the substrate S2;
the hot-melt adhesive K comprises at least one aldimine A and at least one polyurethane polymer P which contains isocyanate groups and is solid at room temperature, wherein the aldimine A has formula (I-A):

wherein $X^P$ is a polyamine having w primary amino groups following removal of w primary amino groups;
w is an integer of from 2 to 8: and
Y is a radical of formula (I a) or formula (I b):

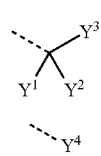

wherein $Y^1$ and $Y^2$ are either
independently of one another, each a monovalent hydrocarbon radical having 1 to 12 C atoms, or together, a divalent hydrocarbon radical having 4 to 20 C atoms that is part of an unsubstituted or substituted carbocyclic ring having 5 to 8 C atoms;

$Y^3$ is a monovalent hydrocarbon radical that optionally has at least one heteroatom; and $Y^4$ is either
a substituted or unsubstituted aryl or heteroaryl group that has a ring size of 5 to 8 atoms, or

wherein $R^1$ is a hydrogen atom, an alkoxy group, or is a substituted or unsubstituted alkenyl or arylalkenyl group having 1 to 30 C atoms;

the hot-melt adhesive K reduces a gradual loss of adhesion between the adhesive and the substrate that is the plasticizer-containing plastic as compared to a same hot melt adhesive that does not contain the at least one aldimine A; and the polyurethane polymer P is prepared from at least one polyisocyanate and a mixture of at least one amorphous polyester diol with at least one polyester diol that is liquid at room temperature.

12. The process according to claim 11, wherein step iii), v'), or ii") is followed by a step of crosslinking the hot-melt adhesive K by reacting the isocyanate groups with water.

13. The process according to claim 11, wherein the plasticizer-containing plastic is in the form of a film.

14. The process according to claim 11, wherein the plasticizer-containing plastic is plasticized polyvinyl chloride (pPVC).

15. The process according to claim 11, wherein both substrates, S1 and S2, are plasticized polyvinyl chloride (pPVC).

16. The process according to claim 11, wherein one of the two substrates, S1 or S2, is plasticized polyvinyl chloride (pPVC) and the other of the two substrates, S2 or S1, is a polycarbonate (PC), an acrylonitrile-butadiene-styrene copolymer (ABS), a PC/ABS blend, or a PC/ABS composite.

17. The process according to claim 11, wherein the polyamine deriving from the radical $X^P$ is selected from the group consisting of 1,6-hexamethylenediamine, 1,5-diamino-2-methylpentane (MPMD) 1,3-diaminopentane (DAMP), 1-amino-3-aminomethyl-3,5,5-trimethylcyclohexane (i.e. isophoronediamine or IPDA), 2,2,4- trimethylhexamethylenediamine, 2,4,4-trimethylhexamethylenediamine, 4-aminomethyl-1,8-octanediamine, 1,3- xylylenediamine, 1,4-xylylenediamine, 1,3-bis(aminomethyl)cyclohexane, 1,4-bis(aminomethyl)cyclohexane, bis-(4-aminocyclohexyl) methane, bis-(4-amino-3-methylcyclohexyl)methane, 3(4),8 (9)-bis(aminomethyl)tricyclo[5.2.1.0$^{2,6}$]decane, 1,2-diaminocyclohexan, 1,3-diaminocyclohexan, 1,4-diaminocyclohexane, polyoxyalkylene-diamines, polyoxyalkylene-triamines, and mixtures of two or more of the aforementioned polyamines.

18. The process according to claim 11, wherein Y is the radical of the formula (I a).

19. The process according to claim 11, wherein $Y^1$ and $Y^2$ are each methyl.

20. The process according to claim 11, wherein $Y^3$ is a radical of formula (II) or formula (III):

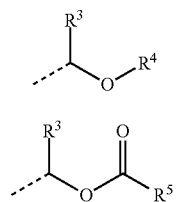

wherein $R^3$ is a hydrogen atom or is an alkyl or arylalkyl group;
$R^4$ is a hydrocarbon radical having 1 to 30 C atoms that optionally contains heteroatoms; and
$R^5$ either
  is a hydrogen atom, or
  is a linear or branched alkyl radical having 1 to 30 C atoms, optionally with cyclic fractions and optionally with at least one heteroatom, or
  is a singly or multiply unsaturated, linear or branched hydrocarbon radical having 5 to 30 C atoms, or
  is an unsubstituted or substituted, aromatic or heteroaromatic 5- or 6-membered ring.

21. The process according to claim 11, wherein the hot-melt adhesive K is substantially free from plasticizers.

22. An article obtained by the process according to claim 11.

23. The article according to claim 22, wherein the article is a support laminated with pPVC film.

24. The process according to claim 11, wherein a weakening of adhesive bonds is reduced and/or prevented upon storage of the adhesively bonded substrates.

25. The process according to claim 11, wherein after storage for 7 days at 90° C. and 100% relative humidity, the tensile strength and/or the breaking extension of the hot-melt adhesive K is higher than a same adhesive without at least one aldimine A.

26. The process according to claim 11, wherein the polyamine deriving from the radical $X^P$ is selected from the group consisting of polyoxyalkylene-diamines, polyoxyalkylene-triamines, and mixtures thereof.

27. The process according to claim 11, wherein the hot-melt adhesive K comprises 9.2 to 10.5 parts by weight of the at least one aldimine A and 100 parts by weight of the at least one polyurethane polymer P.

28. The process according to claim 11, wherein the at least one amorphous polyester diol is solid at room temperature.

* * * * *